US005378297A

United States Patent [19]

Chang et al.

[11] Patent Number: 5,378,297

[45] Date of Patent: Jan. 3, 1995

[54] FERRITE CHIP BEAD AND METHOD FOR MAKING SAME

[75] Inventors: Dong S. Chang, Kyonggi-Do; Sang S. Lee, Seoul, both of Rep. of Korea

[73] Assignee: Boam R&D Co., Ltd., Seoul, Rep. of Korea

[21] Appl. No.: 16,599

[22] Filed: Feb. 11, 1993

[51] Int. Cl.[6] .................. C03B 29/00

[52] U.S. Cl. .................. 156/89; 156/244.15; 156/250; 156/271; 156/259; 156/433; 156/441; 156/52; 29/25.42; 264/174; 264/139; 264/148; 264/149; 336/84 M; 336/233; 336/234; 336/223

[58] Field of Search .................. 156/244.15, 250, 271, 156/259, 433, 441, 52, 89; 264/174, 272.14, 139, 148, 149; 29/25.42; 336/84 M, 233, 234, 223

[56] References Cited

U.S. PATENT DOCUMENTS

| | | | |
|---|---|---|---|
| 2,134,752 | 11/1938 | Ehlers | 264/148 |
| 2,596,284 | 5/1952 | Peters | 264/174 |
| 2,596,285 | 5/1952 | Peters | 18/47.5 |
| 2,780,837 | 2/1957 | Hart | 156/89 |
| 2,844,693 | 7/1958 | Rigterink | 156/89 |
| 2,879,185 | 3/1959 | King | 156/89 |
| 3,235,939 | 2/1966 | Rodriguez | 156/89 |
| 3,261,239 | 7/1966 | Moons | 264/139 |
| 3,300,843 | 1/1967 | Umewaka | 156/89 |
| 3,406,737 | 10/1968 | Duflot | 264/174 |
| 3,468,999 | 9/1969 | Hillert | 264/174 |
| 3,505,139 | 4/1970 | Wentworth | 156/89 |
| 3,604,082 | 9/1971 | McBrayer | 156/89 |
| 3,808,575 | 4/1974 | Brandt et al. | 338/262 |
| 3,819,439 | 6/1974 | Taylor | 156/89 |
| 3,821,053 | 6/1974 | Wilcox | 156/89 |
| 3,882,059 | 5/1975 | Elderbaum | 29/25.42 |
| 3,893,230 | 7/1975 | Stadlen | 156/89 |
| 4,322,698 | 3/1982 | Takahashi | 333/184 |
| 4,350,968 | 9/1982 | Tokasz | 338/16 |
| 4,417,228 | 11/1983 | Takimi et al. | 338/34 |
| 4,468,435 | 8/1984 | Shimba | 264/46.1 |
| 4,796,079 | 1/1989 | Hettigen | 357/68 |
| 4,824,623 | 4/1989 | Rambosek | 264/60 |
| 4,828,902 | 5/1989 | Welygan et al. | 428/105 |
| 4,956,114 | 9/1990 | Watanabe et al. | 501/10 |
| 4,958,134 | 9/1990 | Sawa et al. | 333/12 |
| 5,001,014 | 3/1991 | Charles | 428/472 |
| 5,053,092 | 10/1991 | Lachman | 156/89 |
| 5,120,377 | 6/1992 | Morohashi | 156/89 |
| 5,163,499 | 11/1992 | Newkirk et al. | 164/98 |
| 5,181,026 | 1/1993 | Granville | 340/870.28 |

FOREIGN PATENT DOCUMENTS

| | | | |
|---|---|---|---|
| 1207952 | 6/1967 | United Kingdom | 264/148 |
| 1077676 | 8/1967 | United Kingdom | 264/174 |
| 1100105 | 1/1968 | United Kingdom | 264/174 |
| 1343418 | 9/1974 | United Kingdom | 264/174 |

*Primary Examiner*—W. Gary Jones
*Assistant Examiner*—Mark De Simone
*Attorney, Agent, or Firm*—Lieberman & Nowak

[57] ABSTRACT

A ferrite chip bead includes a ferrite substrate, a plurality of outer electrodes formed at opposite sides of the ferrite substrate, and a plurality of conductive leads each extending transversely through the ferrite substrate and having opposite ends protruded outwardly of opposite side surfaces of the ferrite substrate and connected to corresponding outer electrodes. Conductive leads are embedded in the ferrite substrate by introducing conductive leads in a central portion of a nozzle for extruding the ferrite substrate such that the conductive leads are embedded in the ferrite substrate being extruded, or by introducing conductive leads between ferrite substrate sheets being fed to be bonded together for forming the ferrite substrate such that the conductive leads are interposed between the ferrite substrate sheets being bonded. The ferrite chip has no tendency for outer electrodes to short-circuit from the ferrite substrate upon carrying the chip bead on a circuit board. Manufacture is simplified and short circuits are prevented, thus enhancing reliability and productivity.

12 Claims, 3 Drawing Sheets

FERRITE CHIP BEAD AND METHOD FOR MAKING SAME

BACKGROUND OF THE INVENTION

The present invention relates to a ferrite chip bead and a method for making the same, and more particularly to a ferrite chip bead capable of being mounted on the surface of a circuit board and its method of manufacture. Ferrite chip beads are well known as elements for removing undesirable electron waves by impedance, which is determined by the amount of ferrite substrate. When current flows through the ferrite substrate, a portion of the frequency band exhibiting high reduced loss is absorbed in the ferrite substrate and discharged as heat (in accordance with the characteristics of ferrite substrate).

Chip beads having the above characteristics are useful as elements for mounting on the surface of a circuit board.

FIG. 4*a* illustrates a conventional chip bead structure. As shown in FIG. 4*a*, the chip bead has a double-layered sheet structure comprising a pair of ferrite sheets 1 which constitute a ferrite substrate. Ferrite sheets 1 have facing inner surfaces printed with conductive paste (not shown). The sheet is cut to have a desired size and then subjected to baking. Thereafter, a plurality of outer electrodes [4'] are attached to opposite sides of the sheet structure to form the chip bead. Alternatively, a plurality of transversely extending holes are perforated in the ferrite sheet structure (denoted by the reference numeral 1 in FIG. 4*a*) prior to printing the conductive paste. Conductive paste 2 is filled into each hole with subsequent processes being the same as mentioned above.

Manufacture of such a chip bead structure is troublesome since ferrite paste is printed on each sheet or filled in holes perforated in the ferrite sheet structure. Moreover, inner conductors formed by printing conductive paste have small area and weak bonding due to their structure. As a result, there exists problems with poor contact between inner conductors and outer electrodes and a tendency for outer electrodes to short-circuit from the ferrite substrate upon placement of the chip bead on a circuit board. Since the inner conductors have a microstructure, they may be varied in electric characteristic (upon baking), together with the ferrite substrate.

The above stated disadvantages prevent known chip bead structures from use in electrical circuits requiring a high level of reliability.

SUMMARY OF THE INVENTION

An object of the invention is to eliminate the disadvantages encountered by the prior art and to provide a ferrite chip bead and a method for making the same that simplifies manufacture, prevents short circuits, and enhances reliability and productivity.

The present invention provides a ferrite chip bead comprising a ferrite substrate, a plurality of conductive leads each extending traversely through the ferrite substrate and having opposite ends protruded outwardly of opposite side surfaces of the ferrite substrate and connected to corresponding outer electrodes.

The present invention also provides a method for making a ferrite chip bead comprising the steps of extruding a ferrite slurry through a nozzle of an extruder to form a ferrite substrate having a single-layered sheet structure, introducing a plurality of conductive leads in a central portion of the nozzle such that the conductive leads are embedded in the ferrite substrate being extruded, cutting the ferrite substrate so that it has a predetermined size in which each conductive lead has opposite ends protruded outwardly of opposite side surfaces of the ferrite substrate, baking the ferrite substrate, and forming a plurality of outer electrodes at the opposite side surfaces of the ferrite substrate.

The present invention further provides a method for making a ferrite chip bead comprising the steps of extruding a ferrite slurry through the nozzle of an extruder to form a pair of ferrite substrate sheets, feeding the ferrite substrate sheets through pressing rollers to bond the ferrite substrate sheets together to form a ferrite substrate with a double-layered sheet structure, introducing a plurality of conductive leads between the ferrite substrate sheets such that the conductive leads are interposed between the ferrite substrate being bonded, cutting the ferrite substrate so that it has a predetermined size in which each conductive lead has opposite ends protruded outwardly of opposite side surfaces of the ferrite substrate, baking the ferrite substrate, and forming a plurality of outer electrodes at the opposite side surfaces of the ferrite substrate.

DETAILED DESCRIPTION OF THE INVENTION

The subject invention will now be described in terms of its preferred embodiments. These preferred embodiments are set forth to aid in understanding the subject invention, however, they are not to be construed as limiting.

Figure 4A:
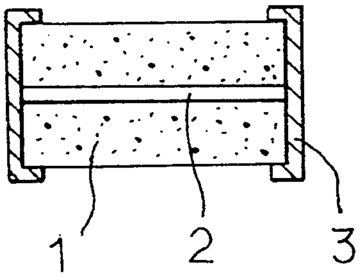
FIG. 4a PRIOR ART
FIGS. 4*a* and 4*b* are a sectional view and a side view, respectively, of a conventional (prior art) structure of a ferrite chip bead.
Figure 4B:
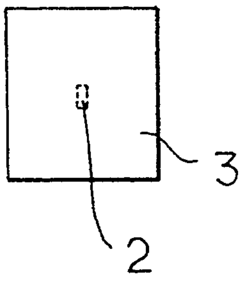
FIG. 4b PRIOR ART
Figure 4C:
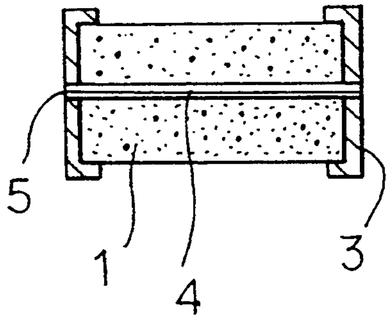
FIGS. 4*c* and 4*d* are a sectional view and a side view, respectively, of the subject ferrite chip bead.
Figure 4D:
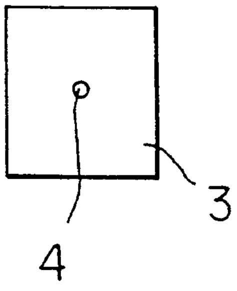

FIGS. 4*c* and 4*d* illustrate a ferrite chip bead with a structure according to the present invention. As shown in FIGS. 4*c* and 4*d*, the ferrite chip bead of the present invention comprises ferrite substrate 1, a plurality of outer electrodes 3 formed at opposite sides of the ferrite substrate 1 and a plurality of conductive leads 4 each extending transversely through the ferrite substrate 1 and having opposite ends 5 protruded outwardly of opposite side surfaces of the ferrite substrate 1 and connected to corresponding outer electrodes 3.

The conductive leads 4 may be formed simultaneously with an extrusion for forming the ferrite substrate 1 having a single sheet structure. Alternatively, the conductive leads 4 may be formed simultaneously with pressing and bonding two ferrite substrate sheets being fed to form the ferrite substrate.

Each conductive lead 4 has a low electric resistance and thermal properties sufficient to resist melting at temperatures experienced when conductive lead 4 is baked together with ferrite substrate 1. Preferably, conductive leads 4 are made of silver, palladium or silver-palladium (Ag, Pd or Ag-Pd) alloy.

It is also preferred that each conductive lead 4 does not have smooth surface, but rather a knurled or grooved surface, so as to improve the bonding force between conductive lead 4 and ferrite substrate 1.

Ferrite substrate 1 may be formed to a size corresponding to a plurality of ferrite substrate modules each constituting a chip bead. In this case, ferrite substrate 1 is subjected to a cutting process, to be divided into a plurality of ferrite substrate modules. The cutting process is carried out such that each conductive lead 4 has opposite ends 5 protruded outwardly of opposite side surfaces of each ferrite substrate module and connected to the corresponding outer electrodes 3.

A method for making the chip bead of the present invention will now be described in detail.

First, a mixture is prepared which contains from about 85 weight % to about 96 weight % of ferrite powder of a $MO.Fe_2O_3$ based composition, wherein M is selected from a group consisting of manganese, nickel, zinc, copper, magnesium, cobalt (Mn, Ni, Zn, Cu, Mg, Co), and mixtures thereof, and from about 4 weight % to about 15 weight % of a material selected from a group consisting of rubbers, organic high molecular weight compound-based bonding materials, plasticizers, defoaming agents, wetting agents and lubricants. The mixture is then subjected to a moistening process to yield a moisture content of from about 15 weight % to about 25 weight % liquid. Thereafter, the moistened mixture is aged and sufficiently mulled, to obtain a ferrite slurry.

The ferrite slurry is used for forming the ferrite substrate. In accordance with the present invention, the formation of ferrite substrate is carried out using one of two processes illustrated in FIGS. 3*a* and 3*b*, respectively.

Figure 1:
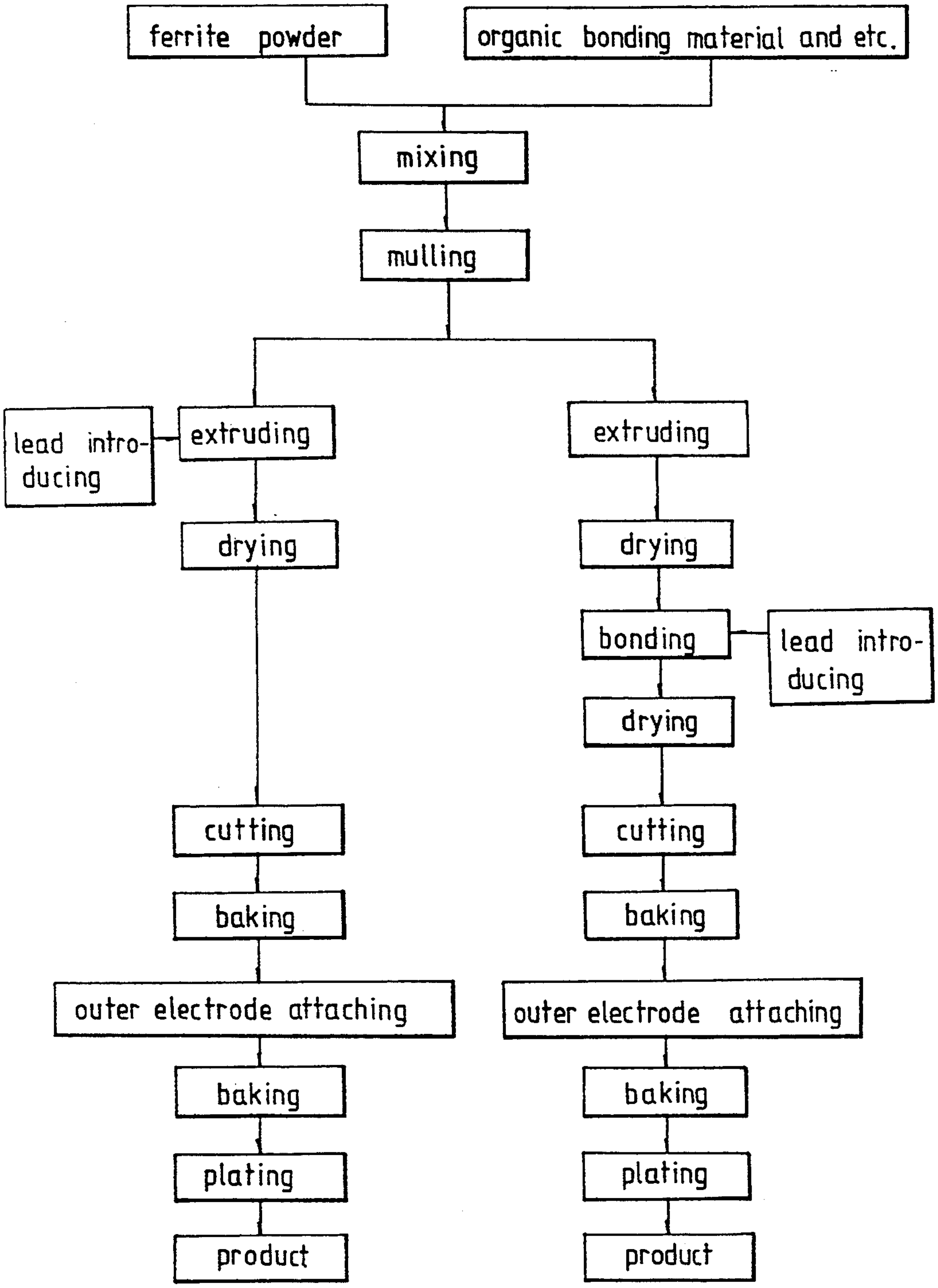
FIG. 1 is a flowchart illustrating the subject procedure for making a ferrite chip bead.
Figure 2:
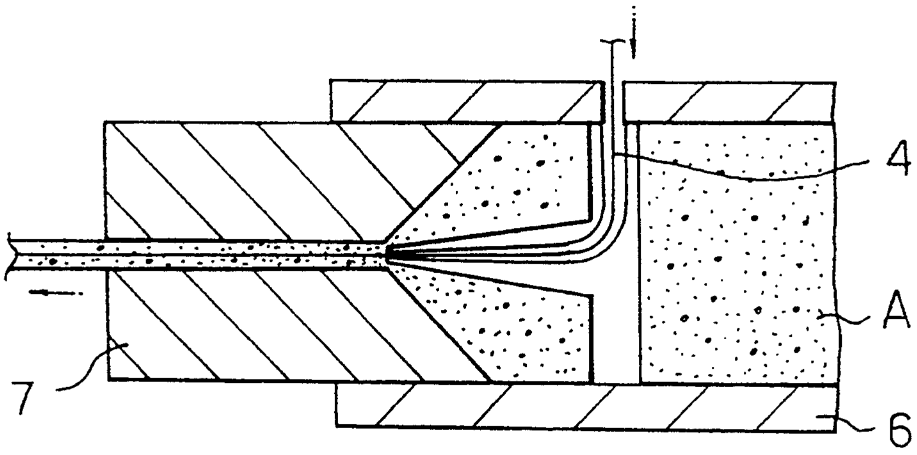
FIG. 2 is partial sectional view illustrating the subject process for introducing a plurality of conductive leads in a ferrite substrate.

In accordance with the first process, ferrite slurry A is extruded through nozzle 7 of extruder 6, to form ferrite substrate having a sheet structure with a size of from about 0.9 mm×1.2 mm to about 1.6 mm to 3.2 mm, as shown in FIG. 2. At this time, conductive leads having a diameter of about 0.2 mm are continuously supplied at the central portion of nozzle 7 to form conductive leads 4 extending transversely through each ferrite substrate sheet structure.

Figure 3A:
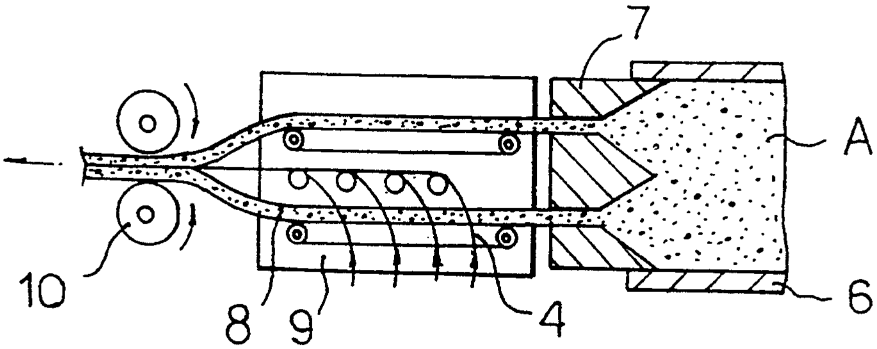
FIGS. 3*a* and 3*b* are a sectional view and a plan view, respectively, illustrating the subject process for introducing a plurality of conductive leads between a pair of ferrite substrate sheets being bonded.
Figure 3B:
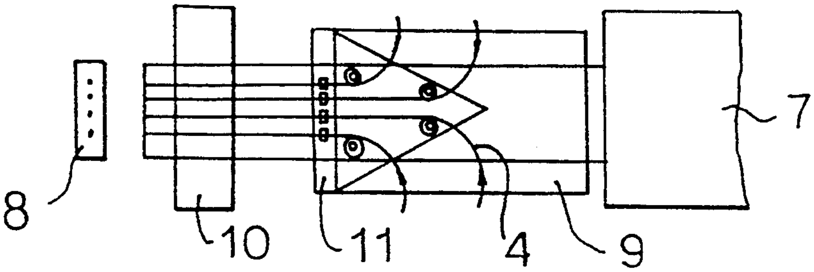

In accordance with the second process, ferrite slurry A is extruded to form two ferrite substrate sheets which constitute one ferrite substrate as they are bonded together. The ferrite substrate sheets are formed by continuously extruding ferrite slurry A through a nozzle 7 to a thickness of from about 0.5 mm to about 1.6 mm, as shown in FIG. 3*a*. These ferrite substrate sheets (denoted by the reference numeral 8) are then dried as they are fed through dryer 9 (shown in FIG. 3*b*). The dried ferrite substrate sheets 8 are then fed to pressing rollers 10, to be bonded together. At this time, conductive leads are supplied between the ferrite substrate sheets 8 by a guide 11 to form conductive leads 4 extending transversely between the bonded ferrite substrate sheets.

Ferrite substrate formed according to one of the processes illustrated in FIGS. 2 and 3*a* is dried and then subjected to a cutting process to form ferrite substrate modules with a desired size. The cutting process is carried so that each conductive lead has opposite ends protruded from opposite side surfaces of each ferrite substrate module (shown in FIGS. 4*c* and 4*d*).

Each ferrite substrate module is then subjected to a baking process at a temperature of from about 1,000° C. to about 1,150° C. Where the conductive leads contain Pd, each ferrite substrate module is subjected to a cooling process in a nitrogen atmosphere, so as to prevent Pd contained in the conductive leads from oxidizing.

Thereafter, a plurality of outer electrodes 3 are formed at opposite side surfaces of the ferrite substrate structure such that they are in contact with corresponding protruded ends of conductive leads. The formation of outer electrodes 3 is achieved by properly dipping each ferrite substrate module in a bath containing a paste of Ag, Pd or Ag-Pd alloy.

Each ferrite substrate module with outer electrodes 3 is dried and then baked at a temperature of from about 700° C. to about 900° C. Thereafter, a metal such as copper, nickel or tin (Cu, Ni or Sn) is plated on cuter electrodes 3, so as to enhance the weldability, heat resistance and durability of the outer electrodes. Thus, a chip bead is formed.

As apparent from the above description, the present invention provides a method for making a ferrite chip bead wherein a plurality of conductive leads having superior thermal properties are embedded in a ferrite substrate simultaneously with an extrusion of the ferrite substrate or a bonding of ferrite substrate sheets. Each conductive lead has opposite ends protruded outwardly of opposite side surfaces of the ferrite substrate and connected with the corresponding outer electrodes. With this structure it is possible to enhance bonding forces between each outer electrodes to minimize short-circuit from the ferrite substrate upon carrying the chip bead on a circuit board. The conductive leads have nc defect after baking and do not have a microstructure as in conventional structures. As a result, it is possible to simplify manufacture and prevent short circuits, thereby enhancing reliability and productivity.

Although the preferred embodiments of the inventions have been disclosed for illustrative purposes, those skilled in the art will appreciate that various modifications, additions and substitutions are possible, without departing from the scope and spirit of the invention as disclosed in the accompanying claims.

What is claimed is:

1. A ferrite chip bead comprising:

a. a ferrite substrate;

b. a plurality of outer electrodes formed at opposite sides of the ferrite substrate; and c. a plurality of conductive leads each extending transversely through the ferrite substrate and having opposite ends protruded outwardly of opposite side surfaces of the ferrite substrate and connected to corresponding outer electrodes.

2. A ferrite chip bead in accordance with claim 1, wherein the ferrite substrate has single-layered sheet structure formed by an extrusion and the conductive leads are embedded in the ferrite substrate upon extruding the single-layered sheet structure.

3. A ferrite chip bead in accordance with claim 1, wherein the ferrite substrate has double-layered sheet structure comprising a pair of bonded ferrite substrate sheets and the conductive leads are embedded in the ferrite substrate upon bonding the ferrite substrate sheets together.

4. A ferrite chip bead in accordance with claim 1, wherein each conductive lead is made of Ag, Pd or Ag-Pd alloy.

5. A ferrite chip bead in accordance with claim 2, wherein each conductive lead is made of Ag, Pd or Ag-Pd alloy.

6. A ferrite chip bead in accordance with claim 3, wherein each conductive lead is made of Ag, Pd or Ag-Pd alloy.

7. A ferrite chip bead in accordance with claim 1, wherein each conductive lead has a knurled or grooved surface.

8. A ferrite chip bead in accordance with claim 2, wherein each conductive lead has a knurled or grooved surface.

9. A ferrite chip bead in accordance with claim 3, wherein each conductive lead has a knurled or grooved surface.

10. A ferrite chip bead in accordance with claim 4, wherein each conductive lead has a knurled or grooved surface.

11. A method for making a ferrite chip bead comprising the steps of:

a. extruding a ferrite slurry through an extruder nozzle to form a ferrite substrate having a single-layered sheet structure;

b. introducing a plurality of conductive leads in a central portion of the nozzle such that the conductive leads are embedded in the ferrite substrate being extruded;

c. cutting the ferrite substrate so that it has a predetermined size in which each conductive lead has opposite ends protruded outwardly of opposite side surfaces of the ferrite substrate;

d. baking the ferrite substrate; and e. forming a plurality of outer electrodes at the opposite side surfaces of the ferrite substrate.

12. A method for making a ferrite chip bead comprising the steps of:

a. extruding a ferrite slurry through extruder nozzles to form a pair of ferrite substrate sheets;

b. feeding the ferrite substrate sheets to pressing rollers, to bond the ferrite substrate sheets together for forming a ferrite substrate with a double-layered sheet structure;

c. introducing a plurality of conductive leads between the ferrite substrate sheets being fed such that the conductive leads are interposed between the ferrite substrate sheets being bonded;

d. cutting the ferrite substrate so that it has a predetermined size in which each conductive lead has opposite ends protruded outwardly of opposite side surfaces of the ferrite substrate;

e. baking the ferrite substrate; and f. forming a plurality of outer electrodes at the opposite side surfaces of the ferrite substrate.

* * * * *